United States Patent Office.

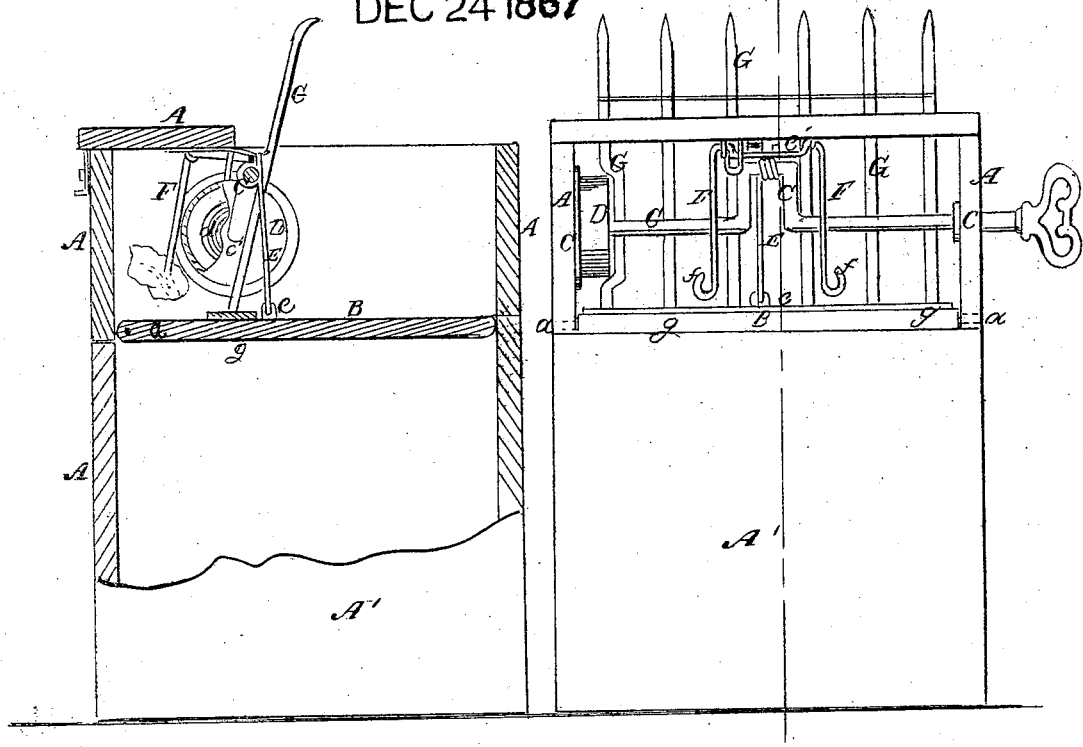

W. H. DAVIS, OF LEXINGTON, INDIANA, ASSIGNOR TO JOSEPH HARLAN, OF SAME PLACE.

Letters Patent No. 72,461, dated December 24, 1867.

IMPROVED ANIMAL-TRAP.

*The Schedule referred to in these Letters Patent and making part of the same.*

TO ALL WHOM IT MAY CONCERN:

Be it known that I, W. H. DAVIS, of Lexington, in the county of Scott, and State of Indiana, have invented a new and improved Animal-Trap; and I do hereby declare that the following is a full, clear, and exact description thereof, which will enable those skilled in the art to make and use the same, reference being had to the accompanying drawings, forming part of this specification.

This invention relates to an improved animal-trap, whereof—

Figure 1 is a transverse, and

Figure 2 a longitudinal vertical section at line $x\ x$, fig. 1.

Similar letters of reference indicate corresponding parts.

It consists of a box, the floor or trap-door whereof is pivoted in the walls. A crank-shaft having its bearings in the walls of the box, and operated by a spring or weight, is connected with said floor by a connecting-rod or pitman attached to the floor by a staple. The bait is hung to a trigger, on which is a catch to hold the crank. The animal pulling at the bait, the catch releases the crank, which flies round, thrusting down the floor and throwing the animal into a box or other receptacle placed beneath the trap or forming part thereof, the crank then drawing said trap-door up again. A row of wire bars fixed upright in the trap-door serves to prevent the escape of the animal in case, from any cause, the trap-door does not fly back to close the trap. The box is closed on every side but one, so as to compel the animal to approach the bait from that one direction, and being unable to pass through the wire bars, is compelled to draw the bait towards it, and thus release the crank.

A is the box, and B the floor or trap-door thereof, pivoted in the walls of the box A at $a$. C is a crank-shaft, having its bearings in the walls of said box at $c$ and $c'$. At the end, $c'$, is a watch-spring, $d$, having one end secured in the wall of the barrel D, as usual in clock-movements, and the other to the crank-shaft C, which may have its bearing $c'$ in the wall of the barrel D, instead of in the wall of the box A. The top part of the trap only being open, the animal enters there and pulls at the bait through the bars G G, secured in the floor of the box A at $g$, to prevent the animal for whom the trap is designed from passing more than his snout between them. The animal thus pulling at the bait lifts up the bent or horizontal portion of the trigger, thereby releasing the lip $e'$, when the recoil of the spring $d$ causes the crank-shaft C to revolve in the first half of its revolution, thrusting down the trap-door B, and throwing the animal upon it into a vessel containing water, or any other desired receptacle, while in the other half of the revolution of the crank-shaft C, the trap-door is restored to its original position, and the lip $e'$, caught at the completion of such revolution in the bent arm of the trigger $f$, holds the crank-shaft and resets the trap. It is of course evident that the barrel D is to be securely attached to the wall of the box A, and that the motive-power derived from the spring may be replaced by a weight suspended to a cord, and wound round an axle or barrel on crank-shaft C. E is a pitman connected by the crank-shaft C to floor of box A by staple $e$. F F is a trigger of bent wire, hung from staples in the roof of box A, and catching the crank-shaft by its lip or projection $e'$, which in the present instance is the terminal part of the pitman E, which is fastened to the crank-shaft C by being coiled around it. The bait is hung on the hooks $f f$, the back of the box A being removable or hung on hinges for the purpose of giving access to said hooks, and the trap-door closed, preventing the escape of the animal. When the spring is relaxed, or from any cause the trap-door does not resume its original position, the wires G serve to prevent the escape of the animal. In the present instance, the box A is placed over a box, A', whereof it forms a part, but it is only necessary that the box A should be securely attached to some receptacle placed beneath the trap-door, whether forming part thereof or not.

I claim as new, and desire to secure by Letters Patent—

1. The crank-shaft C, operated by the spring $d$ or its equivalent, in combination with the trap-door B, substantially as above set forth and described.

2. The bars G, in combination with the trap-door B, substantially as specified.

3. The trigger F, substantially as described, in combination with crank-shaft C and trap-door B, substantially as above set forth and described.

W. H. DAVIS.

Witnesses:
 JAMES POWERS,
 ADDISON R. CLOSE.